United States Patent
Kramer et al.

(10) Patent No.: US 6,170,159 B1
(45) Date of Patent: Jan. 9, 2001

(54) MANUALLY GUIDED IMPLEMENT HAVING A DRIVE MOTOR

(75) Inventors: Jochen Kramer, Waiblingen; Dieter Kremsler, Spiegelberg; Karl-Heinz Lange, Remshalden; Stephan Ostendorf, Weinstadt, all of (DE)

(73) Assignee: Andreas Stihl AG & Co. (DE)

( * ) Notice: Under 35 U.S.C. 154(b), the term of this patent shall be extended for 0 days.

(21) Appl. No.: 08/960,479

(22) Filed: Oct. 29, 1997

(30) Foreign Application Priority Data

Oct. 29, 1996 (DE) .............................................. 196 44 906

(51) Int. Cl.[7] .................................................... A01G 3/053
(52) U.S. Cl. ............................... 30/216; 30/123.3; 30/228
(58) Field of Search ..................................... 30/123.3, 210, 30/216, 228, 369; 74/47, 48, 25, 587, 467; 474/91

(56) References Cited

U.S. PATENT DOCUMENTS

| | | | |
|---|---|---|---|
| 3,073,027 | * 1/1963 | O'Neilly | 30/216 |
| 3,802,075 | * 4/1974 | Taylor et al. | 30/216 |
| 5,531,027 | * 7/1996 | Martinez et al. | 30/216 |
| 5,666,730 | * 9/1997 | Aiyama | 30/216 X |

* cited by examiner

Primary Examiner—Douglas D. Watts
(74) Attorney, Agent, or Firm—Robert W. Becker & Associates

(57) ABSTRACT

A manually guided implement having a drive motor is provided. For a translatory movement of a tool member, the rotational movement of the drive motor must be converted by a gear arrangement, which has a gear wheel that is coupled with a component that glides on the end face of the gear wheel. To significantly reduce frictional losses and also wear of the pertaining components, a constantly effective, reliable lubricant is required. For this reason, at least one cutout is provided in the main body of the gear wheel and/or in the component that can glide on the end face thereof. Such cutouts are open to a glide plane and serve to accommodate a lubricant.

13 Claims, 5 Drawing Sheets

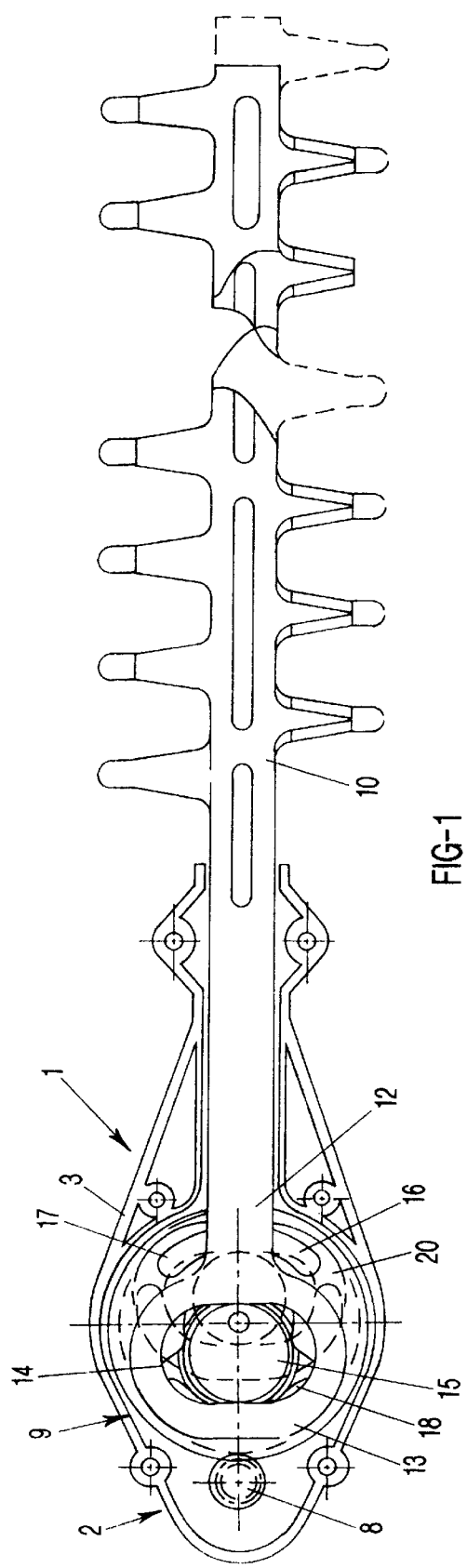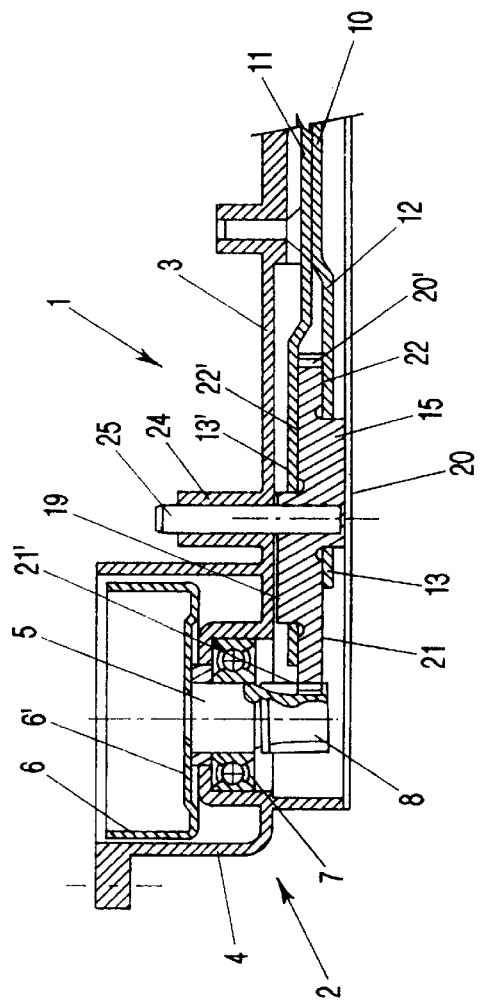

MANUALLY GUIDED IMPLEMENT HAVING A DRIVE MOTOR

BACKGROUND OF THE INVENTION

The present invention relates to a manually guided tool or implement, especially a hedge trimmer, having a drive motor.

DE 38 16 362 A1 discloses a motor-driven hedge trimmer that includes two trimmer blades that are driven by a gear arrangement disposed between the drive motor and the trimmer blades. The gear arrangement includes, among other things, a gear wheel that is mounted on a king pin and can be coupled with an eccentric wheel. The eccentric wheel comprises a main body that is provided on each end face with an eccentric projection, whereby the two eccentrics are disposed diametrically opposed from one another. The eccentrics engage in openings of coupling levers, which in turn are pivotably connected to the trimmer blades.

The coupling levers are embodied in such a way that merely a small surface comes in contact with the end face of the eccentric wheel, which leads to a high pressure per unit of area. However, this causes increased wear since abrasion cannot be avoided at the end faces of the eccentric wheel.

It is therefore an object of the present invention to provide a manually guided implement of the aforementioned general type that with a construction that is as straight forward as possible encounters considerably reduced wear.

BRIEF DESCRIPTION OF THE DRAWINGS

This object, and other objects and advantages of the present invention, will appear more clearly from the following specification in conjunction with the accompanying schematic drawings, in which:

FIG. 1 shows the underside of a housing having a gear arrangement and trimmer blades coupled therewith;

FIG. 2 is an axial cross-sectional view through the gear arrangement that is accommodated in the housing;

SUMMARY OF THE INVENTION

Figure 3:
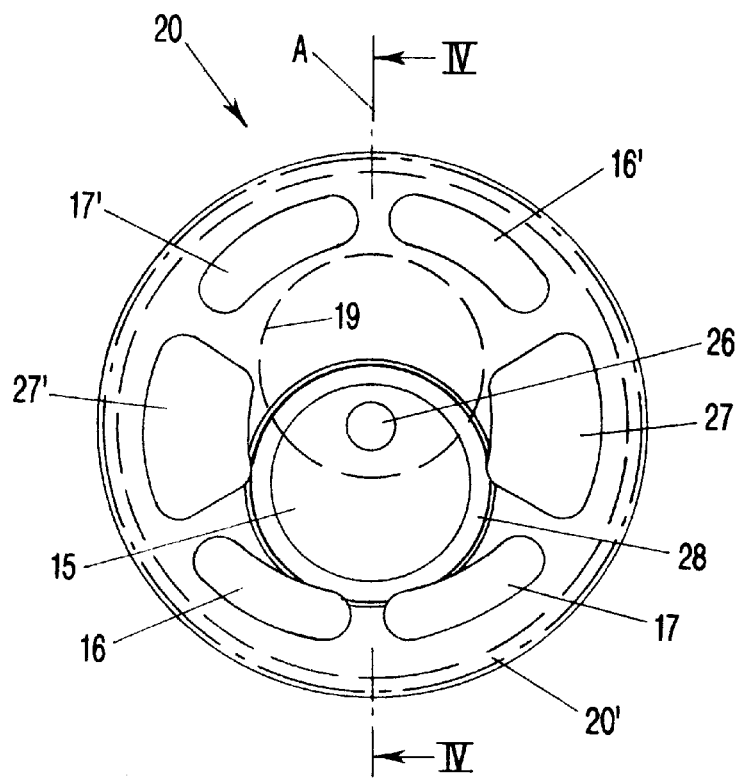
FIG. 3 is a view of a gear wheel taken in the axial direction.

The manually guided tool or implement of the present invention is characterized primarily by a gear arrangement that is operatively disposed between the drive motor and a tool member, the gear arrangement including at least one gear wheel and a component, connected to the tool member, that is adapted to glide on an end face of a main body of the gear wheel, wherein the main body is provided with at least two cutouts that serve for accommodating lubricant, and wherein the cutouts in the main body of the gear wheel are open toward both end faces of the main body and form glide planes on each of such end faces.

The essential advantages of the present invention are that without additional structural components an effective lubrication of the highly stressed surfaces is ensured, with this lubrication being maintained over a long operating duration of even several hours. The lubricant is a grease having a viscosity that, although it changes as a function of change in temperature, yet does not liquify. The cutouts serve as grease depositories, with the cutouts being open in the direction toward the glide plane, so that the glide surface of the component that is glidable along the end face of the gear wheel is always smeared with the grease that is present at that location. Glide planes are formed on both end faces of the main body, and the cutouts in the main body of the gear wheel are open toward both of these end faces. In this way, the grease depository in each cutout simultaneously serves for lubricating both glide planes.

At least two cutouts are expediently diametrically disposed in the gear wheel. This results in a uniform lubricant application over the glide plane, whereby an excess quantity of the lubricant removed from a cutout is given up to the respectively following cutout. A particularly preferred embodiment of the cutouts is provided when such cutouts are slots that extend in the circumferential direction. In this connection, it is expedient for six cutouts to be distributed over the circumference of the main body, with these cutouts being symmetrically disposed relative to a radial axis.

In one specific embodiment of the present invention, the component that cooperates with the gear wheel is an arrangement for converting a rotational movement into a translatory movement. For this purpose, the component is eccentrically mounted on the gear wheel, with this component having an opening into which an eccentric projection on the end face of the main body engages. With this arrangement according to the connecting-rod principle, the component is a connecting rod that is pivotably connected to a cutting blade. To reduce the number of structural components required for the transmission of power, the component, which is preferably a trimmer blade of a hedge trimmer, can be provided at the rear end of the trimmer blade with an integral ring in which is disposed an opening that operates as a guide means for the eccentric.

In order to avoid a hardening of the lubricant as a consequence of aging thereof, it is expedient to act upon the volume of grease in such a way that there is always a slight displacement of the lubricant parallel to the axis of rotation of the gear wheel. In this way, lubricant is constantly delivered to the glide planes, i.e. the glide surface of the component, and is carried along by the component. So that an excess quantity of grease that may have been removed from the lubricant depository is not squeezed to the outside, but rather is conveyed in a directed manner to the subsequent cutout, it is advantageous to provide at least one groove on the main body in the vicinity of a glide surface for the component; this groove extends between two cutouts and interconnects them. In this connection, pursuant to one preferred specific embodiment of the present invention, an annular groove is provided that is tangent to several, and preferably to four, of the cutouts. In a particularly advantageous manner, the groove extends along the peripheral contour at the base of the eccentric, resulting in the effect that the outer surface of the eccentric and the guide means are also lubricated.

Further specific features of the present invention will be described in detail subsequently.

DESCRIPTION OF THE PREFERRED EMBODIMENTS

Referring now to the drawings in detail, FIG. 1 shows the underside of a hedge trimmer 1 having a trimmer blade 10 that is mounted in a housing 2 in such a way as to be longitudinally displaceable. The housing 2 includes a transmission housing 3 in which is disposed a gear arrangement 9 that is coupled with the trimmer blade 10. The gear arrangement 9 essentially comprises a gear wheel 20, which is driven by a pinion 8, as well as a cam or eccentric 15 that is disposed on an end face of the gear wheel 20 and engages an opening 18 of the trimmer blade 10; this opening is formed within a ring 13 disposed at the rear end 12 of the trimmer blade 10. As viewed in the longitudinal direction of the trimmer blade 10, the opening 18 has an inner dimension that corresponds to the diameter of the eccentric 15. However, viewed at right angles to the longitudinal direction, the opening 18 is wider, so that the inner peripheral surface of the ring 13 forms a guide means 14 for the surface of the eccentric 15. Provided in the gear wheel 20 are cutouts 16, 17 that are radially spaced from the outer periphery of the gear wheel 20 and extend in the manner of an arc of a circle (also FIG. 3).

FIG. 2 is an axial cross-sectional view through the gear arrangement 9 as well as through the pinion 8, which can be coupled with a drive motor. The housing 2 comprises not only the transmission housing 3 but also, integrally therewith, a clutch housing 4. Disposed within the clutch housing 4 is a clutch drum 6, on the base 6' of which the pinion 8 is connected in such a way as to be resistant to torque. The shaft 5 of the pinion 8 is disposed adjacent to the base 6' of the clutch drum 6; this shaft 5 is accommodated in a ball bearing means 7. The pinion 8 meshes with the toothed rim 20' of the gear wheel 20, which comprises a main body 23, from on the end faces 21, 21' of which the eccentric 15 as well as an eccentric 19 project. A shaft 25 is centrally disposed in the gear wheel 20. This shaft is accommodated in a bearing or support means 24 formed on the transmission housing 3. As can furthermore be clearly seen from FIG. 2, the hedge trimmer 1 comprises two trimmer blades 10 and 11 that can be moved relative to one another and that are received on the end faces 21, 21' of the gear wheel 20 in the same manner although in a mirror-inverted arrangement. In this connection, the opening through which the eccentrics 15 and 19 project is provided in the angled-off rear end 12, so that the respective ring 13 surrounds the surfaces of the eccentrics 15 and 19. As a consequence, the rings 13, 13' rest against the end faces 21, 21' respectively of the main body 23, so that a glide surface or plane 22, 22' is formed between the main body 23 and the ring 13, 13'.

FIG. 3 is a view in the axial direction showing the gear wheel 20 as an individual component. As indicated previously, the gear wheel 20 is provided on its outer periphery with a toothed rim 20'. In addition, the central portion of the gear wheel 20 has a hole 26 for receiving the shaft 25 that is illustrated in FIG. 2. Disposed in the main body 23, radially inwardly from the toothed rim 20', are a total of six cutouts, 16, 17, 27, 16', 17' and 27', that extend in the manner of an arc of a circle and have the shape of slots. In this connection, the cutouts 27, 27' are wider in a radial direction than the cutouts 16, 17, 16', 17'. When viewed relative to the axis A, which extends perpendicular to the axis of rotation of the gear wheel 20, the cutouts 17, 27, 16' and 16, 27, 17 are symmetrically arranged. It can also be clearly seen from FIG. 3 that the mass centers of the eccentrics 15 and 19 are also disposed on the axis A and each have the same radial spacing relative to the axis of rotation, so that the gear wheel 20 practically does not suffer from an unbalance. Extending along the peripheral surface of the eccentric 15 is a circular groove 28, the outer peripheral edge of which intersects radially inwardly disposed regions of the cutouts 16, 17, 27 and 27'; in other words, the annular groove 28 is tangent to four of the six cutouts of the main body 23.

Figure 4:
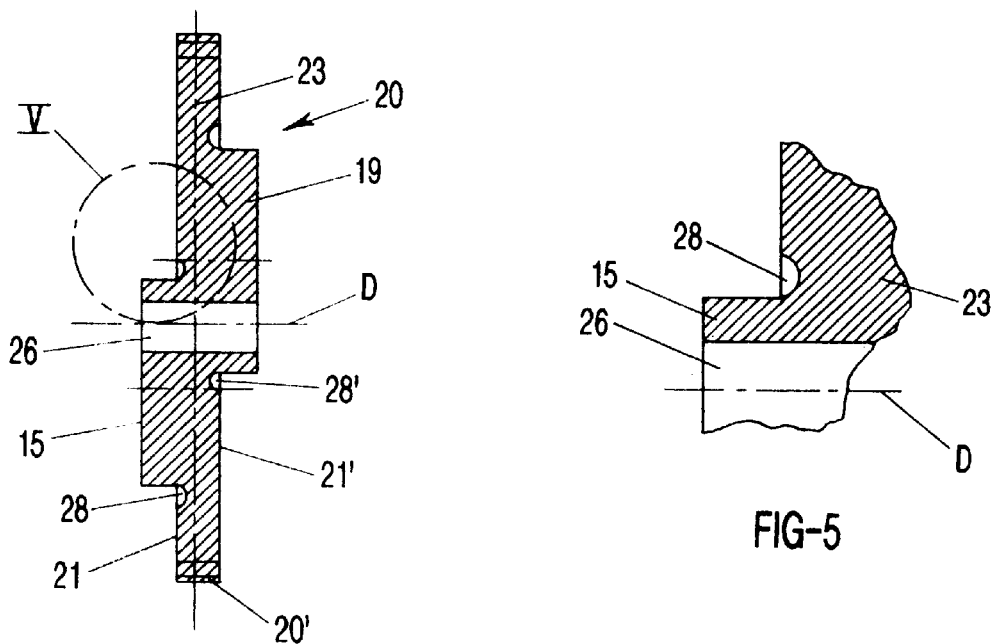
FIG. 4 is a cross-sectional view taken along the line IV—IV in FIG. 3.

FIG. 4 is a cross-sectional taken along the line IV—IV in FIG. 3. From this view, it can be seen that the main body 23 has a respective eccentric 15, 19 on the end faces 21 and 21' respectively; these eccentrics have the same size and the same radial spacing relative to the axis of rotation D. Disposed on the peripheral surface of the eccentric 15 is the annular groove 28, which is disposed at the base of the eccentric in the end face 21. A corresponding annular groove 28' is disposed on the eccentric 19, i.e. on the end face 21'.

Figure 5:
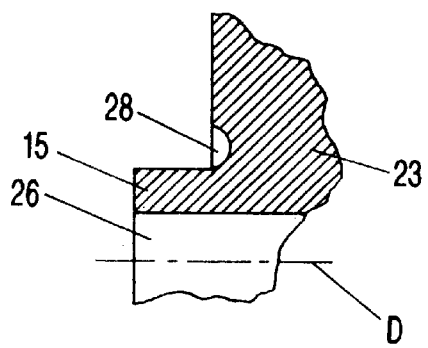
FIG. 5 is an enlarged view of the encircled portion V in FIG. 4.

FIG. 5 is an enlarged view of the encircled portion V in FIG. 4. Disposed in the main body 23 is the annular groove 28, which extends precisely along the peripheral surface of the eccentric 15, with the outer rim thereof being formed by the end face 21 of the main body 23.

Figure 6A:
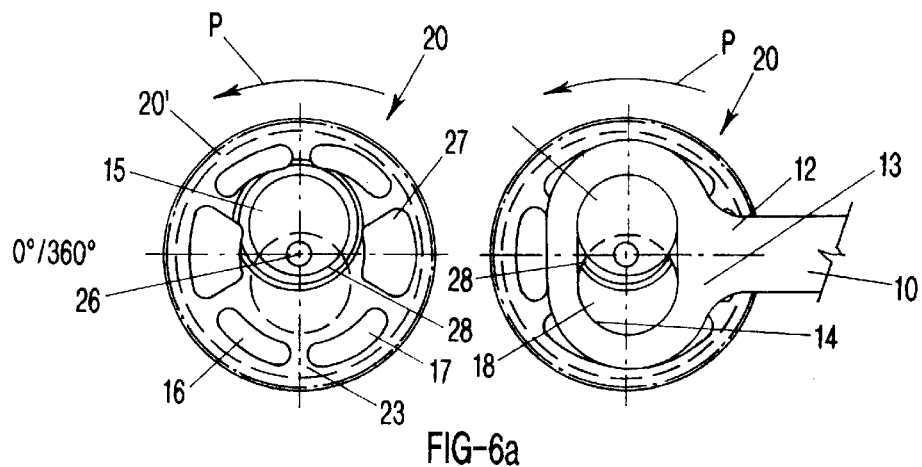
FIGS. 6a–6d illustrate the rotational movement of the gear wheel, and the resulting movement of the trimmer blades, in four different angular positions.
Figure 6B:
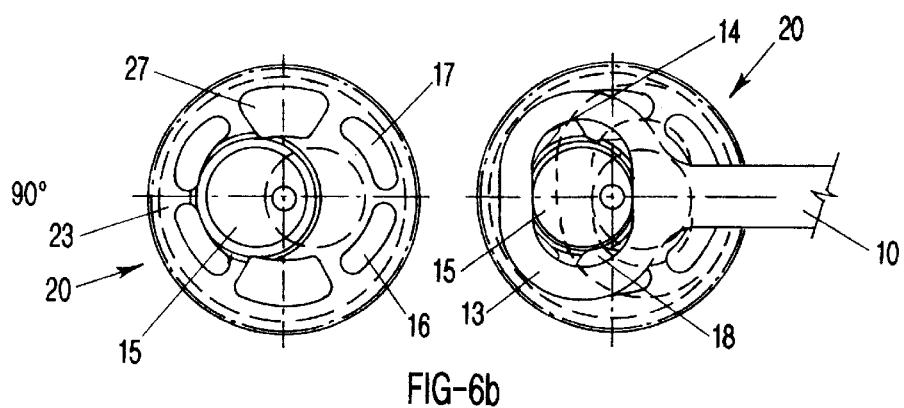
Figure 6C:
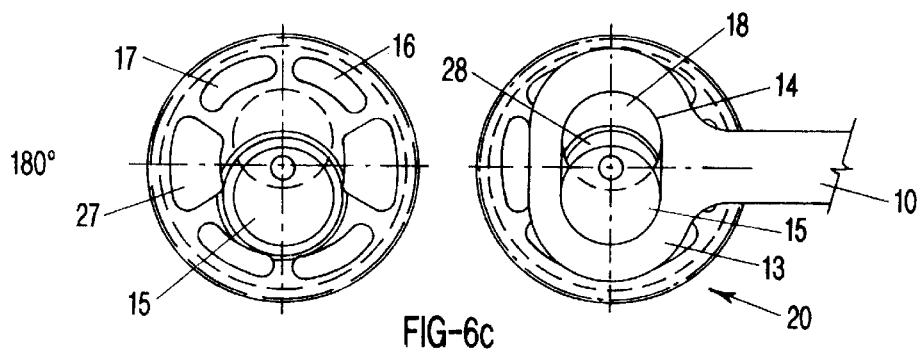
Figure 6D:
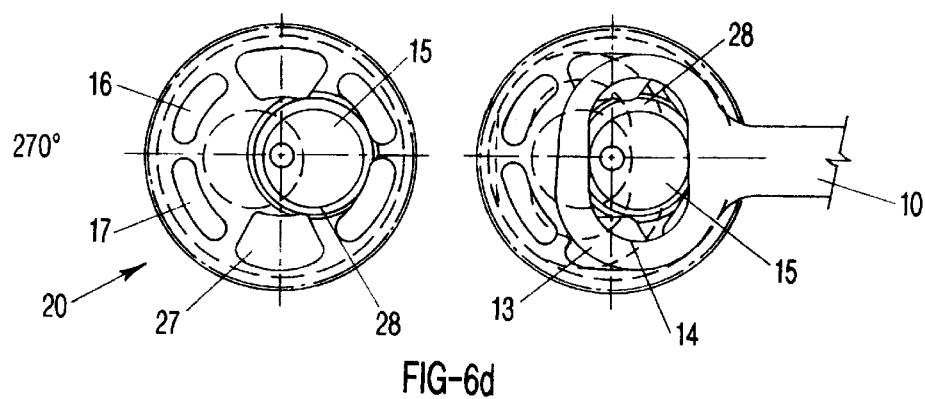

FIGS. 6a–6d are respective views of the gear wheel 20 illustrated in FIG. 3, and in particular in each case once without the pertaining end 12 and once with the pertaining end 12 of the trimmer blade 10. In this connection, FIG. 6a shows the position of the gear wheel 20 at an angle of rotation of 0° or 360°, FIG. 6b shows an angle of rotation of 90°, FIG. 6c shows an angle of rotation of 180°, and FIG. 6b shows an angle of rotation of 270°. Reference numerals for the same parts correspond to those of FIG. 3.

As shown in FIG. 6a, the eccentric 15 is disposed in the uppermost position, and hence is disposed in a region of the ring 13 in which the guide means 14 of the opening 18 has a curved shape, with the curve of the arch corresponding to the surface of the eccentric 15. From this position, the gear wheel 20 is rotated about the axis of rotation D in the direction of the arrow P, so that the eccentric 15 of the gear wheel 20 passes into the position illustrated in FIG. 6b. In so doing, the peripheral surface of the eccentric 15 moves along the guide means 14 in that portion thereof in which the guide means 14 extends linearly, as a consequence of which the ring 13 moves toward the left in the drawing and hence the trimmer blade 10 is also pulled to the left. The ring 13 glides along the surface 21 of the gear wheel 20 and is provided with a lubricant charge due to the movement along the cutouts 16, 17, 27, which serve as lubricant depositories.

As the gear wheel 20 continues to rotate in the direction of the arrow P about the axis of rotation D, the eccentric 15 passes into the position shown in FIG. 6c, where the eccentric 15 is disposed in the lowermost position. As a consequence of this movement of the eccentric 15, the ring 13, and hence also the trimmer blade 10, are again moved toward the right, and by means of a further rotation of the gear wheel 20 the trimmer blade is shifted still further in the longitudinal direction thereof, as a consequence of which the eccentric 15 rests against a linear portion of the guide means 14. This movement sequence leads to a gliding of the ring 13 over the end face 21 and over the lubricant-filled cutouts 16, 17, 27, 16', 17', 27', so that the ring 13 is constantly smeared within an adequate quantity of lubricant. Excess lubricant is conveyed by the movement of the ring 13 to the following cutouts or is pressed into the annular groove 28, via which the lubricant can be conveyed to one of the openings that is tangent to the annular groove 28.

As a consequence to the lubricant being carried along by the movement of the ring 13, and the pressing-in of a portion of lubricant into the following cutouts, a pump effect results that keeps the lubricant supply moving. In so doing, the lubricant volume pressed into the cutouts by the ring 13 presses upon the lubricant already present in a cutout, so that this lubricant gradually passes in an axial direction to the other end face of the main body, from where it is taken along by the ring that slides on this end face. There thus results a circulation of the lubricant, which counteracts a solidification or gumming. As a consequence of the heating up of the gear mechanism, the viscosity of the lubricant also alters, although liquification is avoided.

Figure 7:
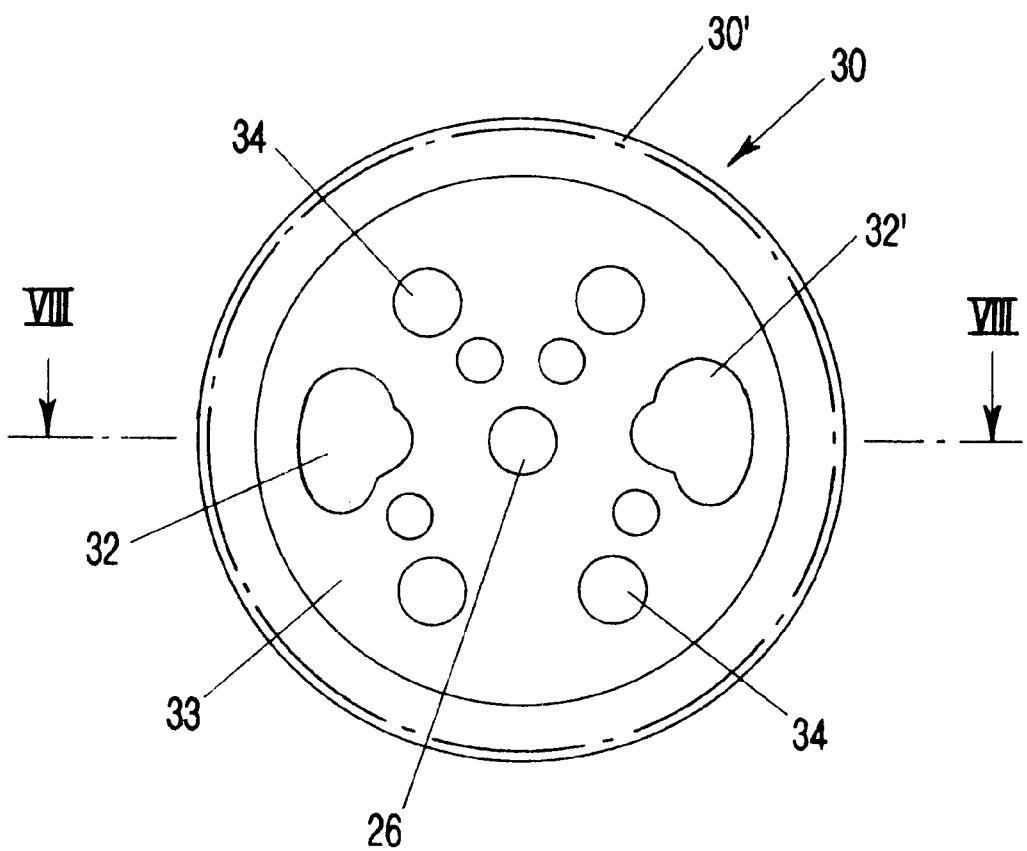
FIG. 7 shows a modified embodiment of a gear wheel.

FIG. 7 shows a gear wheel 30 that is provided in the middle with a central opening 26 for receiving a rotary shaft. A toothed rim 30' is disposed on the outer periphery. Spaced radially not only relative to the central opening 26 but also to the toothed rim 30' are diametrically opposed cutouts 32, 32' that serve for accommodating lubricant. In addition, further uniformly distributed cutouts 34 can be provided that serve as lubricant depositories.

Figure 8:
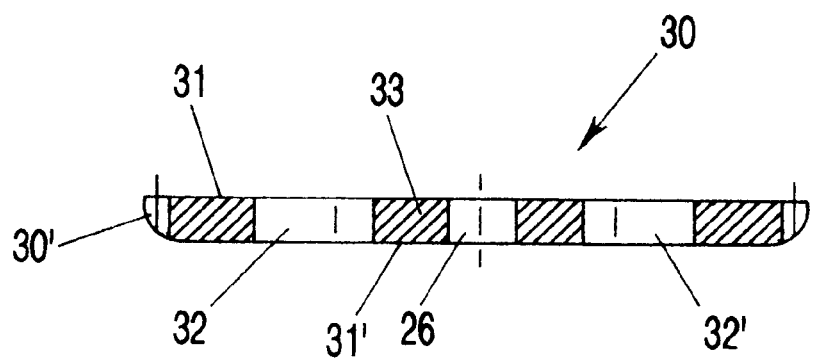
FIG. 8 is a cross-sectional view taken along the line VIII—VIII in FIG. 7.

FIG. 8 is cross-sectional view taken along the line VIII—VIII in FIG. 7. In this embodiment, the main body 33 of the gear wheel 30 has planar end faces 31 and 31'; in other words, no eccentrics are formed on the end faces.

Figure 9:
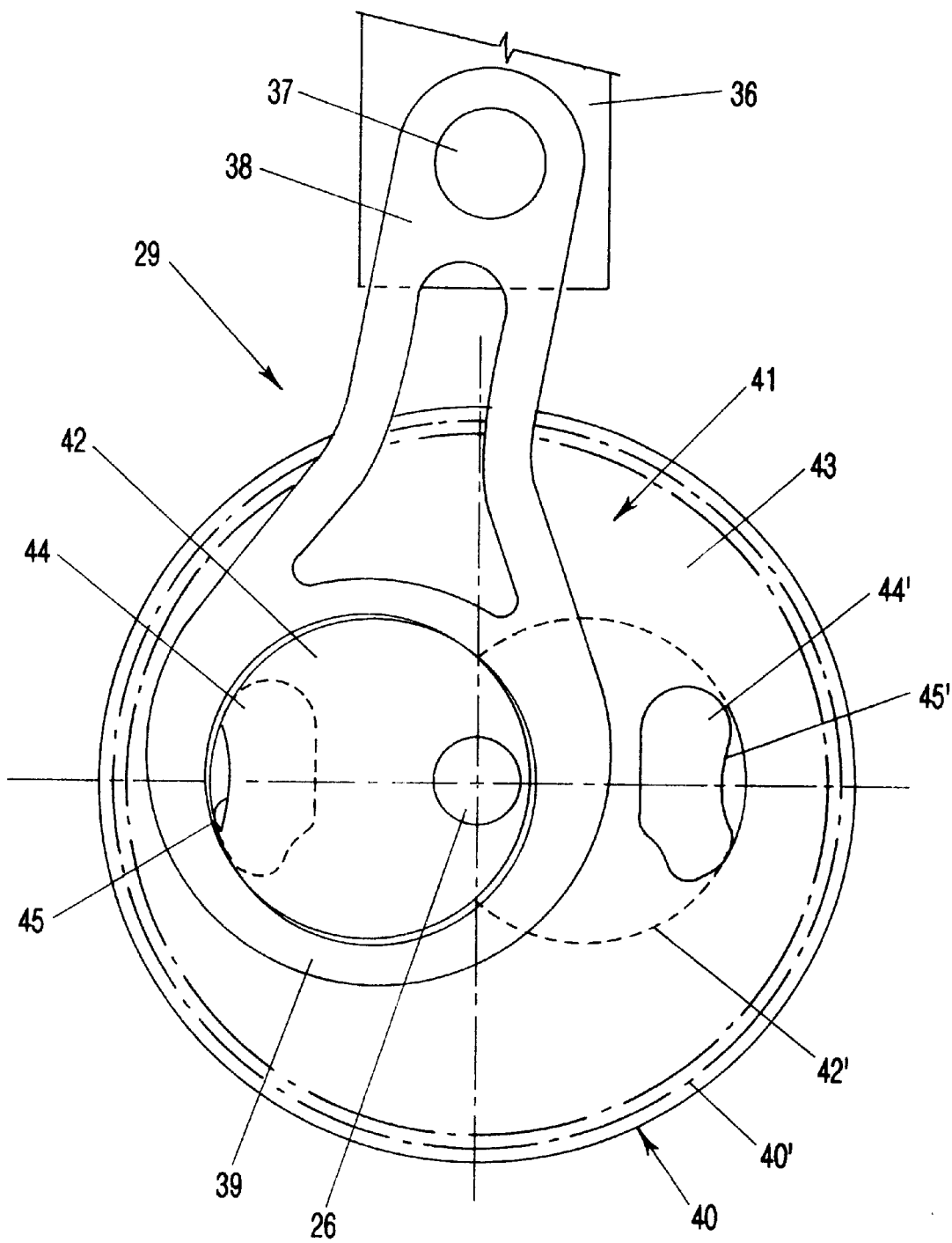
FIG. 9 shows a connecting-rod assembly for a trimmer blade.

FIG. 9 shows an arrangement for converting the movement of a gear wheel 40 to a trimmer blade 36 via a gear arrangement 29 in the from of a connecting-rod assembly. In this connection, a main body 43 of the gear wheel 40 is provided on the front side 41 with an eccentric 42 and on the rear side with an eccentric 42', with these two eccentrics being disposed diametrically relative to one another. Disposed in the middle of the gear wheel 40 is a central hole 26, with a toothed rim 40' being formed on the outer peripheral edge. In the region most remote from the central hole 26, the eccentrics 42 and 42' are each provided with a respective concave curvature 45 or 45'. Disposed in the main body 43 are two cutouts 44 and 44'. The cutout 44 on the front side 41 is covered nearly entirely by the eccentric 42, and the cutout 44' on the back side is similarly covered to a large extent by the eccentric 42'.

Disposed on the eccentric 42 is a ring 39 that is formed on one end of a connecting rod 38 and that thus surrounds the outer surface of the eccentric 42, whereby radial play is provided between the ring 39 and the eccentric 42. At the other end, the connecting rod 38 is mounted on a pin 37 of a trimmer blade 36, so that the circular movement carried out by the eccentric 42 is converted into a longitudinal movement of the trimmer blade 36. An opening is formed between the inner peripheral surface of the ring 39 and the concave curvature 45 of the eccentric 42; this opening provides a communication between the cutout 44 and the outside. As a consequence of the gliding movement of the ring 39 along a circular path, the ring 39 takes up lubricant as it passes over the cutout 44', in the manner described in conjunction with the previous embodiments, and hence takes care of lubricating the glide surfaces. As a consequence of the heat that occurs during operation of the implement, the viscosity of the grease or lubricant is reduced so that the lubricant, enhanced by centrifugal force, can more easily exit the cutout 44 into the lubricating gap. Abrasion particles that accumulate in the cutout are also flushed out with the lubricant and can, due to the radial play between the ring 39 and the eccentric 42, pass to the outside without any binding occurring. To the extent that it is necessary to refill the cutouts with lubricant, the lubricant can be applied to the end face 41 of the gear wheel 40 in the vicinity of the toothed rim 40'; from there, the connecting rod 38 spreads the lubricant into the cutout 44.

The present invention is, of course, in no way restricted to the specific disclosure of the specification and drawings, but also encompasses any modifications within the scope of the appended claims.

What we claim is:

1. A manually guided implement having a drive motor, comprising:
   a gear arrangement operatively disposed between said drive motor and a tool member, said gear arrangement including at least one gear wheel and means, connected to said tool member, for gliding on a respective surface of a main body of said gear wheel, wherein said main body is provided with at least two cutouts that serve for accommodating lubricant, and wherein said cutouts are open at two oppositely disposed surfaces of said main body, and a respective glide plane is formed on each of said surfaces.

2. An implement according to claim 1, wherein each of said oppositely disposed surfaces of said main body of said gear wheel is provided with an eccentric that essentially covers at least one of said cutouts on that end face.

3. An implement according to claim 1, wherein said cutouts are diametrically disposed in said gear wheel.

4. An implement according to claim 3, wherein said cutouts are embodied as slots that extend in a circumferential direction of said gear wheel.

5. An implement according to claim 4, wherein six symmetrically disposed cutouts are distributed over the circular periphery of said gear wheel.

6. An implement according to claim 1, wherein said means connected to said tool member is a component eccentrically mounted on said gear wheel.

7. An implement according to claim 6, wherein said component is provided with an opening for receiving an eccentric projection disposed on said end face of said main body of said gear wheel.

8. An implement according to claim 7, wherein said component is a connecting rod that is pivotably connected to said tool member, which is in the form of a trimmer blade.

9. An implement according to claim 8, wherein said eccentric is provided on a peripheral surface thereof with a concave curvature that provides communication between said cutout and an outer surface of said eccentric.

10. A component according to claim 7, wherein said component is a ring formed on the rear end of said tool member, which is in the form of a trimmer blade, and wherein said opening of said ring forms a guide means.

11. An implement according to claim 7, wherein at least one groove is provided on said main body in the vicinity of a glide surface for said component, and wherein said at least one groove extends between two cutouts and interconnects said cutouts.

12. An implement according to claim 11, wherein one annular groove is provided that is tangent to a plurality, preferably four, of said cutouts.

13. An implement according to claim 12, wherein said groove extends along a peripheral contour of said eccentric.

* * * * *